US007219050B2

(12) United States Patent
Ishikawa et al.

(10) Patent No.: US 7,219,050 B2
(45) Date of Patent: May 15, 2007

(54) AUTOMATIC INTERPRETING SYSTEM INCLUDING A SYSTEM FOR RECOGNIZING ERRORS

(75) Inventors: Kai Ishikawa, Tokyo (JP); Shinichi Ando, Tokyo (JP); Akitoshi Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 1399 days.

(21) Appl. No.: 09/947,438

(22) Filed: Sep. 7, 2001

(65) Prior Publication Data
US 2002/0032561 A1    Mar. 14, 2002

(30) Foreign Application Priority Data
Sep. 11, 2000  (JP)  ............................. 2000-274588

(51) Int. Cl.
*G06F 17/28*    (2006.01)
(52) U.S. Cl. .................... 704/3; 704/9; 704/2; 704/257
(58) Field of Classification Search .................... 704/3, 704/9, 2, 257
See application file for complete search history.

(56) References Cited

U.S. PATENT DOCUMENTS

| 5,060,155 | A | * | 10/1991 | van Zuijlen .................... 704/9 |
| 5,208,748 | A | * | 5/1993 | Flores et al. .................... 704/1 |
| 5,390,279 | A | * | 2/1995 | Strong ......................... 704/200 |
| 5,457,770 | A | * | 10/1995 | Miyazawa .................. 704/255 |
| 5,477,451 | A | * | 12/1995 | Brown et al. .................. 704/9 |
| 5,528,728 | A | * | 6/1996 | Matsuura et al. ........... 704/232 |
| 5,778,157 | A | * | 7/1998 | Oatman et al. ............... 706/46 |
| 5,787,386 | A | * | 7/1998 | Kaplan et al. .................. 704/8 |
| 5,878,390 | A | * | 3/1999 | Kawai et al. ............... 704/331 |
| 6,044,337 | A | * | 3/2000 | Gorin et al. ................... 704/1 |
| 6,128,595 | A | * | 10/2000 | Ruber ........................ 704/255 |
| 6,233,545 | B1 | * | 5/2001 | Datig ............................ 704/2 |
| 6,243,684 | B1 | * | 6/2001 | Stuart et al. ................ 704/275 |
| 7,072,826 | B1 | * | 7/2006 | Wakita .......................... 704/2 |

FOREIGN PATENT DOCUMENTS

| JP | 06-203069 | 7/1994 |
| JP | 09-258776 | 10/1997 |

* cited by examiner

*Primary Examiner*—Vijay Chawan
(74) *Attorney, Agent, or Firm*—Sughrue Mion, PLLC

(57) ABSTRACT

An automatic interpreting system, having at least an inputting unit for inputting utterances, an interpreting unit for recognizing the input utterance and interpreting the input utterance into a specified language, and an outputting unit for outputting interpretation results, includes a conversation history managing unit for determining the level of interpretation reliability calculated based on the interpretation result, having the user input their level of interpretation understanding, and recording and storing this data as interpretation history information, and a conversation status determination processing unit for, if the interpretation of an utterance is not understandable to the receiving party, determining the conversation status by selecting from categories pre-determined based on the levels of interpretation reliability and interpretation understanding for the previous utterance that are stored in the conversation history managing unit, and a recommended action presenting part for presenting to the speaker, as recommended actions, pre-determined actions for the conversation status.

28 Claims, 7 Drawing Sheets

FIG. 3
| COMBINATION OF INTERPRETATION RELIABILITY AND INTERPRETATION UNDERSTANDING | INTERPRETATION RELIABILITY = HIGH (THICK LINE) | INTERPRETATION RELIABILITY = LOW (THIN LINE) |
|---|---|---|
| INTERPRETATION UNDERSTANDING = CLEAR (SOLID LINE) | 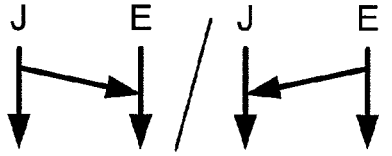 | 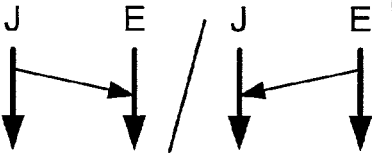 |
| INTERPRETATION UNDERSTANDING = UNCLEAR (DASHED LINE) | 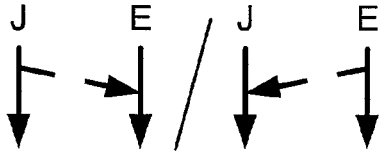 | 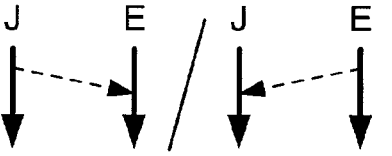 |

FIG. 4

| CONVERSATION STATUS | UTTERANCE CASE APPLICABLE TO CONVERSATION STATUS |
|---|---|
| ENGLISH-TO-JAPANESE – MISUNDERSTOOD | |
| INTERPRETATION OF UTTERANCE OF ENGLISH SPEAKER LEADS TO A MISUNDERSTANDING BY JAPANESE SPEAKER | |
| JAPANESE-TO-ENGLISH – NON-UNDERSTANDABLE | |
| UTTERANCE OF JAPANESE SPEAKER IS NOT UNDERSTOOD BY ENGLISH SPEAKER DUE TO INAPPROPRIATE INTERPRETATION | |
| JAPANESE-TO-ENGLISH – MISUNDERSTOOD | |
| INTERPRETATION OF UTTERANCE OF JAPANESE SPEAKER LEADS TO A MISUNDERSTANDING BY ENGLISH SPEAKER | |
| ENGLISH-TO-JAPANESE – NON-UNDERSTANDABLE | |
| UTTERANCE OF ENGLISH SPEAKER IS NOT UNDERSTOOD BY JAPANESE SPEAKER DUE TO INAPPROPRIATE INTERPRETATION | |

FIG. 5

| CONVERSATION STATUS | RECOMMENDED ACTION TO JAPANESE SPEAKER | DIAGRAM DISPLAY |
|---|---|---|
| ENGLISH-TO-JAPANESE<br>- MISUNDERSTOOD | REQUEST RE-UTTERANCE FROM ENGLISH SPEAKER | 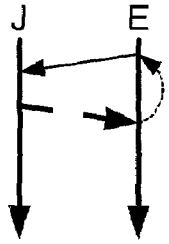 |
| JAPANESE-TO-ENGLISH<br>- NON-UNDERSTANDABLE | JAPANESE SPEAKER INPUTS RE-UTTERANCE<br><br>JAPANESE SPEAKER CHECKS RECOGNITION | 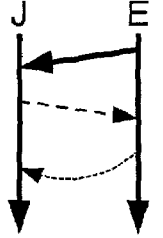 |
| JAPANESE-TO-ENGLISH<br>- MISUNDERSTOOD | JAPANESE SPEAKER INPUTS RE-UTTERANCE | 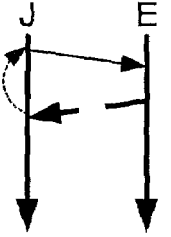 |
| ENGLISH-TO-JAPANESE<br>- NON-UNDERSTANDABLE | REQUEST RE-UTTERANCE FROM ENGLISH SPEAKER<br><br>REQUEST CHECK OF RECOGNITION FROM ENGLISH SPEAKER | 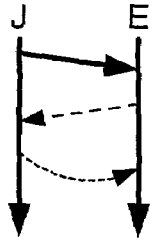 |
| | JAPANESE SPEAKER LOOKS UP ENGLISH-JAPANESE DICTIONARY<br><br>JAPANESE SPEAKER SELECTS NEXT TRANSLATION CANDIDATE | 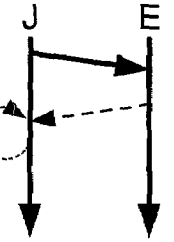 | ly
AUTOMATIC INTERPRETING SYSTEM INCLUDING A SYSTEM FOR RECOGNIZING ERRORS

BACKGROUNDS OF THE INVENTION

1. Field of the Invention

The present invention relates to an automatic interpreting system, an automatic interpreting method, and a storage medium storing a program for automatic interpreting, for the purpose of interpreting conversation between speakers of different languages. In particular, the present invention relates to an automatic interpreting system, an automatic interpreting method, and a program for automatic interpretation that can provide guidance for recovery of communication between users if the interpretation of an utterance is not understandable to the receiving party.

2. Description of the Related Art

In order to achieve automatic interpretation of conversation between speakers of different languages, R&D activities have been promoted in the fields of individual underlying technologies, i.e., speech recognition, automatic translation, and speech synthesis, with focus on enabling audio input of an utterance and audio output of an interpretation of such utterance. Thanks to the advancements made in these fields, the performance of automatic interpretation has steadily improved in recent years, giving additional momentum to R&D activities toward the commercialization of automatic interpretation in and outside Japan. When put to practical use, the technology of automatic interpretation as described above is expected to be utilized by a wide variety of speakers who talk of many different topics in many different situations. It is thus critical for the technology to achieve very high performance consistently in whatever environments in which it may be utilized.

A number of approaches for resolving problems related to robustness have already been proposed. One of these approaches allows the user to identify an error in or a failure of speech recognition or translation and to correct it as necessary. Another approach features automatic detection of errors in recognition results and translation results, audio presentation of recognition results, and presentation of translation results obtained through reverse translation. All these approaches contribute to a reduction in labor on the part of the user in finding errors.

As for the former approach, one method is disclosed, for example, in Japanese Patent Laying-Open No. 09-258776, in which the user corrects errors through pre-edition of sentences for input for automatic translation. According to this method, the user sees errors directly and thus reliable removal of errors can be ensured.

As for the latter approach, one method is disclosed, for example, in Japanese Patent Laying-Open No. 06-203069, in which labor on the part of the user required for correcting errors is reduced by performing grammatical check on sentences before translation and then presenting any error found in the sentences and an action for correcting it.

In the area of automatic interpretation, various methods have been devised and proposed for determining whether recognition results or translation results are correct or not and then correcting detected errors. In fact, there exists a technique for automatic determination of the correctness of speech recognition results or translation results. These, however, are yet to achieve an adequate level of accuracy and coverage. Thus, many of the proposals made in relation to error correction rely on the speaker for final determination and correction of errors.

For example, if the user who is conversing with the aid of an interpreting mechanism is unable to understand an interpreted utterance of the other party, then the inability to understand is due to either an interpretation error in the current utterance or one in the previous utterance. In order to recover the flow of conversation or the conveyance of the meaning when such situation occurs, it is critical to determine the conversation status correctly and take an appropriate action.

However, if the user has little knowledge of the language used by the other party, or has little experience in utilizing an automatic interpreting system, the user can hardly be expected to determine correctly the conversation status and an action to take. Thus, conventional methods, which rely on the speakers for final determination of errors and corrective actions, holds the problem of limitation; they can be viable only if the speaker has some knowledge of the language used by the other party, along with some experience in utilizing an automatic interpreting mechanism.

SUMMARY OF THE INVENTION

The present invention has been made in light of the above-mentioned problem. Its primary object is to provide an automatic interpreting system, an automatic interpreting method, and a program for automatic interpretation that can determine the conversation status correctly and present specific actions to take as appropriate if the user is unable to understand the interpretation result of the other party's utterance generated by the automatic interpreting system.

According to the first aspect of the invention, an automatic interpreting system having at least an inputting means for inputting utterances, an interpreting means for recognizing the input utterance and interpreting the input utterance into a specified language, and an outputting means for outputting interpretation results, comprises means for determining the validity of the interpretation result of the input utterance to obtain interpretation reliability, means for allowing the receiving-side speaker to input as the level of interpretation understanding how well he or she can grasp the meaning of the interpretation result, conversation history managing means for recording and holding, as interpretation history information, the level of interpretation reliability and the level of interpretation understanding for each of the utterance, and conversation status determination processing means for, if the interpretation of an utterance is not understandable to the receiving party, determining the conversation status based on the interpretation reliability and the interpretation understanding for the utterance and the previous utterance that are stored in the interpretation history managing means.

In the preferred construction, the automatic translation system comprises recommended action presenting means for presenting to the speaker, as recommended actions, pre-determined actions for the conversation status determined by the conversation status determination processing means.

In another preferred construction, if the level of interpretation understanding for an utterance is "not understandable," the current conversation status is determined, i.e., whether an error has occurred in the interpretation result of the utterance or a misunderstanding has occurred in the interpretation result of the previous utterance, by putting the combinations of the interpretation reliability and the interpretation understanding for the utterance and for the previous utterance in contrast with the pre-determined categories.

In another preferred construction, the automatic translation system comprises recommended action presenting means for presenting to the speaker, as recommended actions, pre-determined actions for the conversation status determined by the conversation status determination processing means, wherein if the level of interpretation understanding for an utterance is "not understandable," the current conversation status is determined, i.e., whether an error has occurred in the interpretation result of the utterance or a misunderstanding has occurred in the interpretation result of the previous utterance, by putting the combinations of the interpretation reliability and the interpretation understanding for the utterance and for the previous utterance in contrast with the pre-determined categories.

In another preferred construction, if the interpretation reliability is categorized into two values, high and low, and the interpretation understanding is categorized into two values, clear and unclear, and if the interpretation understanding for an utterance is "unclear,"

if the value of the interpretation reliability for the utterance is "high" and the values of the interpretation reliability and the interpretation understanding for the previous utterance are "low" and "clear," respectively, conversation status is determined to be that a misunderstanding has occurred in the interpretation result of the previous utterance, and if the value of the interpretation reliability for the utterance is "high" and the values of the interpretation reliability and the interpretation understanding for the previous utterance are "high" and "clear," respectively, or if the value of the interpretation reliability for the utterance is "low" and the value of the interpretation understanding for the previous utterance is "clear," conversation status is determined to be that an error has occurred in the interpretation result of the utterance.

In another preferred construction, actions to be presented by the recommended action presenting means are selected from options, including requesting re-utterance, re-uttering, requesting check of recognition, looking up dictionary, and selecting next translation candidate.

In another preferred construction, the automatic translation system comprises recommended action presenting means for presenting to the speaker, as recommended actions, pre-determined actions for the conversation status determined by the conversation status determination processing means, wherein actions to be presented by the recommended action presenting means are selected from options, including requesting re-utterance, re-uttering, requesting check of recognition, looking up dictionary, and selecting next translation candidate.

In another preferred construction, if the level of interpretation understanding for an utterance is "not understandable," the current conversation status is determined, i.e., whether an error has occurred in the interpretation result of the utterance or a misunderstanding has occurred in the interpretation result of the previous utterance, by putting the combinations of the interpretation reliability and the interpretation understanding for the utterance and for the previous utterance in contrast with the pre-determined categories, and actions to be presented by the recommended action presenting means are selected from options, including requesting re-utterance, re-uttering, requesting check of recognition, looking up dictionary, and selecting next translation candidate.

In another preferred construction, assuming that the interpretation reliability is categorized into two values, high and low, and the interpretation understanding is categorized into two values, clear and unclear, and if the interpretation understanding for an utterance is "unclear,"

if the value of the interpretation reliability for the utterance is "high" and the interpretation reliability and the interpretation understanding for the previous utterance are "low" and "clear," respectively, conversation status is determined to be that a misunderstanding has occurred in the interpretation result of the previous utterance, and if the value of the interpretation reliability for the utterance is "high" and the values of the interpretation reliability and the interpretation understanding for the previous utterance are "high" and "clear," respectively, or if the value of the interpretation reliability for the utterance is "low" and the value of the interpretation understanding for the previous utterance is "clear," conversation status is determined to be that an error has occurred in the interpretation result of the utterance, and actions to be presented by the recommended action presenting means are selected from options, including requesting re-utterance, re-uttering, requesting check of recognition, looking up dictionary, and selecting next translation candidate.

In another preferred construction, in conversation between a speaker using the first language and another speaker using the second language, if the values of the interpretation reliability and the interpretation understanding for the current utterance in the first language are "high" and "unclear," respectively, and the values of the interpretation reliability and the interpretation understanding for the previous utterance in the second language "low" and "clear," respectively, "request re-utterance from second speaker" is presented by the recommended action presenting means, if the values of the interpretation reliability and the interpretation understanding for the current utterance in the first language are "low" and "unclear," respectively, and the value of the interpretation reliability for the previous utterance in the second language is "high," or if the values of the interpretation reliability and the interpretation understanding for the current utterance in the first language are "low" and "unclear," respectively, and the values of the interpretation reliability and the interpretation understanding for the previous utterance in the second language are "high" and "clear," respectively, "first speaker re-utters" and "first speaker checks recognition" are presented by the recommended action presenting means, if the values of the interpretation reliability and the interpretation understanding for the current utterance in the second language are "high" and "unclear," respectively, and the values of the interpretation reliability and the interpretation understanding for the previous utterance in the first language "low" and "clear," respectively, "first speaker re-utters" is presented by the recommended action presenting means, and if the values of the interpretation reliability and the interpretation understanding for the current utterance in the second language are "low" and "unclear," respectively, and the value of the interpretation reliability for the previous utterance in the first language is "high," or if the values of the interpretation reliability and the interpretation understanding for the current utterance in the second language are "high" and "unclear," respectively, and the values of the interpretation reliability and the interpretation understanding for the previous utterance in the first language are "high" and "clear," respectively, "second speaker re-utters," "second speaker checks recognition," "first speaker looks up dictionary", and "first speaker selects next translation candidate" are presented by the recommended action presenting means.

According to the second aspect of the invention, an automatic interpreting method for recognizing an input utterance, interpreting the input utterance into a specified language, and outputting an interpretation result, comprising the steps of determining the validity of the interpretation result of the input utterance to obtain the level of interpretation reliability, and allowing the receiving-side speaker to input as the level of interpretation understanding how well he or she can grasp the meaning of the interpretation result, recording and holding, as interpretation history information, the level of interpretation reliability and the level of interpretation understanding for each of the utterance, and if the interpretation of an utterance is not understandable to the receiving party, determining the conversation status based on the interpretation reliability and the interpretation understanding for the utterance and the previous utterance that are stored in the interpretation history managing means.

In the preferred construction, pre-determined actions according to the conversation status are presented to the speaker as recommended actions.

In another preferred construction, if the level of interpretation understanding for the utterance is "not understandable," the current conversation status is determined, i.e., whether an error has occurred in the interpretation result of the utterance or a misunderstanding has occurred in the interpretation result of the previous utterance, by putting the combinations of the interpretation reliability and the interpretation understanding for the utterance and for the previous utterance in contrast with the pre-determined categories.

In another preferred construction, pre-determined actions for the conversation status are presented to the speaker as recommended actions, and if the level of interpretation understanding for an utterance is "not understandable," the current conversation status is determined, i.e., whether an error has occurred in the interpretation result of the utterance or a misunderstanding has occurred in the interpretation result of the previous utterance, by putting the combinations of the interpretation reliability and the interpretation understanding for the utterance and for the previous utterance in contrast with the pre-determined categories, assuming that the interpretation reliability is categorized into two values, high and low, and the interpretation understanding is categorized into two values, clear and unclear, and if the interpretation understanding for an utterance is "unclear,"

if the value of the interpretation reliability for the utterance is "high" and the interpretation reliability and the interpretation understanding for the previous utterance are "low" and "clear," respectively, conversation status is determined to be that a misunderstanding has occurred in the interpretation result of the previous utterance, and if the value of the interpretation reliability for the utterance is "high" and the values of the interpretation reliability and the interpretation understanding for the previous utterance are "high" and "clear," respectively, or if the value of the interpretation reliability for the utterance is "low" and the value of the interpretation understanding for the previous utterance is "clear," conversation status is determined to be that an error has occurred in the interpretation result of the utterance.

In another preferred construction, pre-determined actions for the conversation status are presented to the speaker as recommended actions, and actions to be presented as recommended actions are selected from options, including requesting re-utterance, re-uttering, requesting check of recognition, looking up dictionary, and selecting next translation candidate.

In another preferred construction, if the level of interpretation understanding for an utterance is "not understandable," the current conversation status is determined, i.e., whether an error has occurred in the interpretation result of the utterance or a misunderstanding has occurred in the interpretation result of the previous utterance, by putting the combinations of the interpretation reliability and the interpretation understanding for the utterance and for the previous utterance in contrast with the pre-determined categories, and actions to be presented as recommended actions are selected from options, including requesting re-utterance, re-uttering, requesting check of recognition, looking up dictionary, and selecting next translation candidate.

In another preferred construction, if the level of interpretation understanding for an utterance is "not understandable," the current conversation status is determined, i.e., whether an error has occurred in the interpretation result of the utterance or a misunderstanding has occurred in the interpretation result of the previous utterance, by putting the combinations of the interpretation reliability and the interpretation understanding for the utterance and for the previous utterance in contrast with the pre-determined categories, assuming that the interpretation reliability is categorized into two values, high and low, and the interpretation understanding is categorized into two values, clear and unclear, and if the interpretation understanding for an utterance is "unclear,"

if the value of the interpretation reliability for the utterance is "high" and the interpretation reliability and the interpretation understanding for the previous utterance are "low" and "clear," respectively, conversation status is determined to be that a misunderstanding has occurred in the interpretation result of the previous utterance, if the value of the interpretation reliability for the utterance is "high" and the values of the interpretation reliability and the interpretation understanding for the previous utterance are "high" and "clear," respectively, or if the value of the interpretation reliability for the utterance is "low" and the value of the interpretation understanding for the previous utterance is "clear," conversation status is determined to be that an error has occurred in the interpretation result of the utterance, and actions to be presented by the recommended action presenting means are selected from options, including requesting re-utterance, re-uttering, requesting check of recognition, looking up dictionary, and selecting next translation candidate.

In another preferred construction, in conversation between a speaker using the first language and another speaker using the second language, if the values of the interpretation reliability and the interpretation understanding for the current utterance in the first language are "high" and "unclear," respectively, and the values of the interpretation reliability and the interpretation understanding for the previous utterance in the second language "low" and "clear," respectively, "request re-utterance from second speaker" is presented by the recommended action presenting means, if the values of the interpretation reliability and the interpretation understanding for the current utterance in the first language are "low" and "unclear," respectively, and the value of the interpretation reliability for the previous utterance in the second language is "high," or if the values of the interpretation reliability and the interpretation understanding for the current utterance in the first language are "low" and "unclear," respectively, and the values of the interpretation reliability and the interpretation understanding for the previous utterance in the second language are "high" and "clear," respectively, "first speaker re-utters" and "first speaker checks recognition" are presented by the recommended action presenting means, if the values of the interpretation reliability and the interpretation understanding for the current utterance in the second language are "high" and "unclear," respectively, and the values of the interpretation reliability and the interpretation understanding for the previous utterance in the first language "low" and "clear," respectively, "first speaker re-utters" is presented by the recommended action presenting means, and if the values of the interpretation reliability and the interpretation understanding for the current utterance in the second language are "low" and "unclear," respectively, and the value of the interpretation reliability for the previous utterance in the first language is "high," or if the values of the interpretation reliability and the interpretation understanding for the current utterance in the second language are "high" and "unclear," respectively, and the values of the interpretation reliability and the interpretation understanding for the previous utterance in the first language are "high" and "clear," respectively, "second speaker re-utters," "second speaker checks recognition," "first speaker looks up dictionary", and "first speaker selects next translation candidate" are presented by the recommended action presenting means.

According to another aspect of the invention, an automatic translation program for recognizing an input utterance, interpreting the input utterance into a specified language, and outputting an interpretation result, comprising the functions of determining the validity of the interpretation result of the input utterance to obtain the level of interpretation reliability, and allowing the receiving-side speaker to input as the level of interpretation understanding how well he or she can grasp the meaning of the interpretation result, recording and holding, as interpretation history information, the level of interpretation reliability and the level of interpretation understanding for each of the utterance, and if the interpretation of an utterance is not understandable to the receiving party, determining the conversation status based on the interpretation reliability and the interpretation understanding for the utterance and the previous utterance that are stored in the interpretation history managing means.

According to the configuration mentioned above, if the interpretation result of an utterance is determined to be non-understandable to the other party, the present invention can determine whether the inability to understand is due to an error in interpretation of the current utterance or a misunderstanding caused by interpretation of the previous utterance. The present invention can also present specific actions to take as appropriate for the conversation status, by outputting as recommended actions the most appropriate ones among several options, including requesting re-utterance, re-uttering, requesting check of recognition, looking up dictionary, and selecting next translation candidate.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 3 is a diagram showing combinations of interpretation reliability and interpretation understanding and the method for displaying a diagram of such combinations according to one embodiment of the present invention;

FIG. 4 is a diagram showing different conversation statuses and corresponding utterance cases according to one embodiment of the present invention;

FIG. 5 is a diagram showing different conversation statuses and recommended actions presented for each status according to one embodiment of the present invention;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
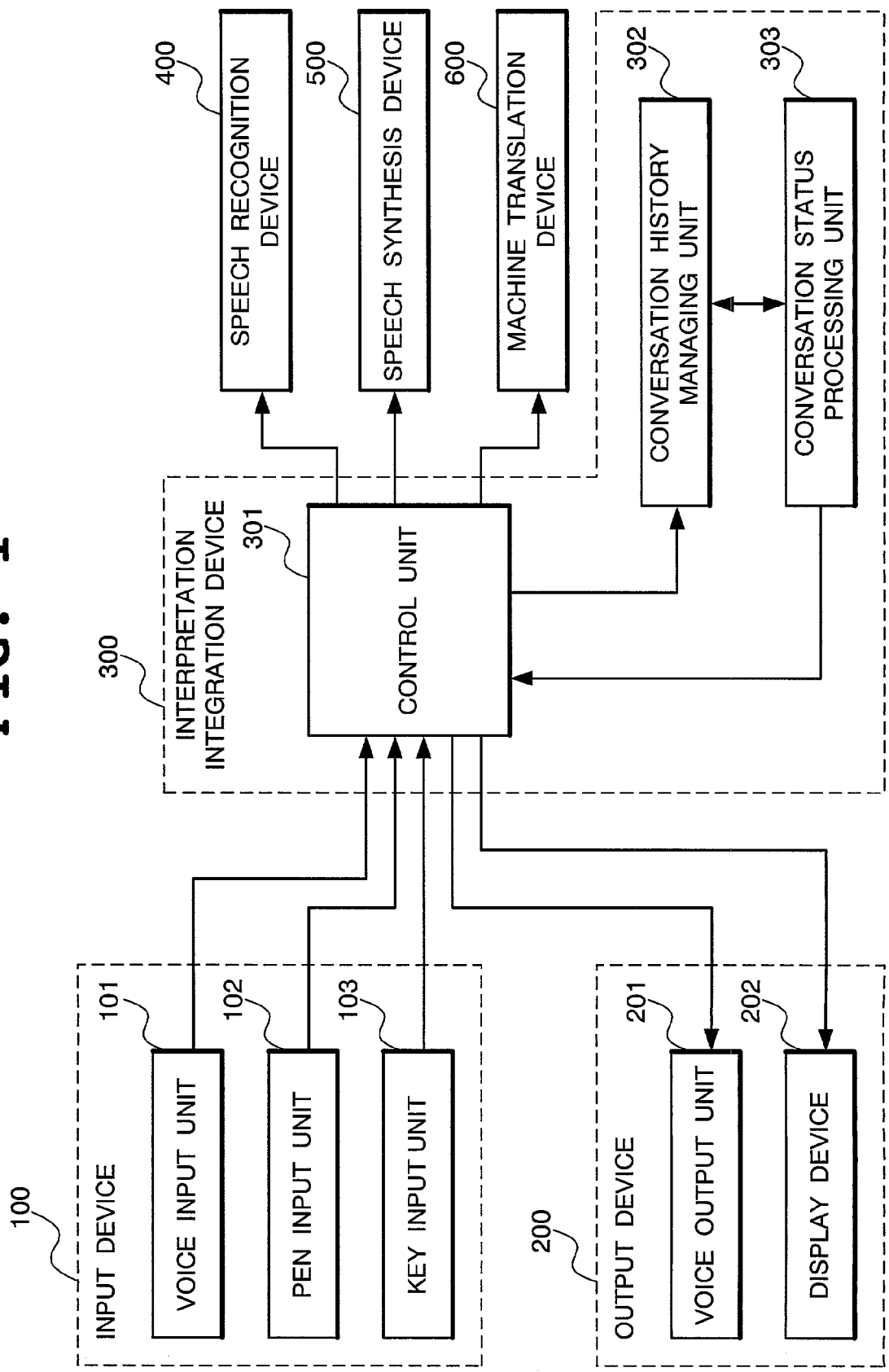
FIG. 1 is a block diagram showing the configuration of an automatic interpreting system according to one aspect of the present invention.
Figure 2:
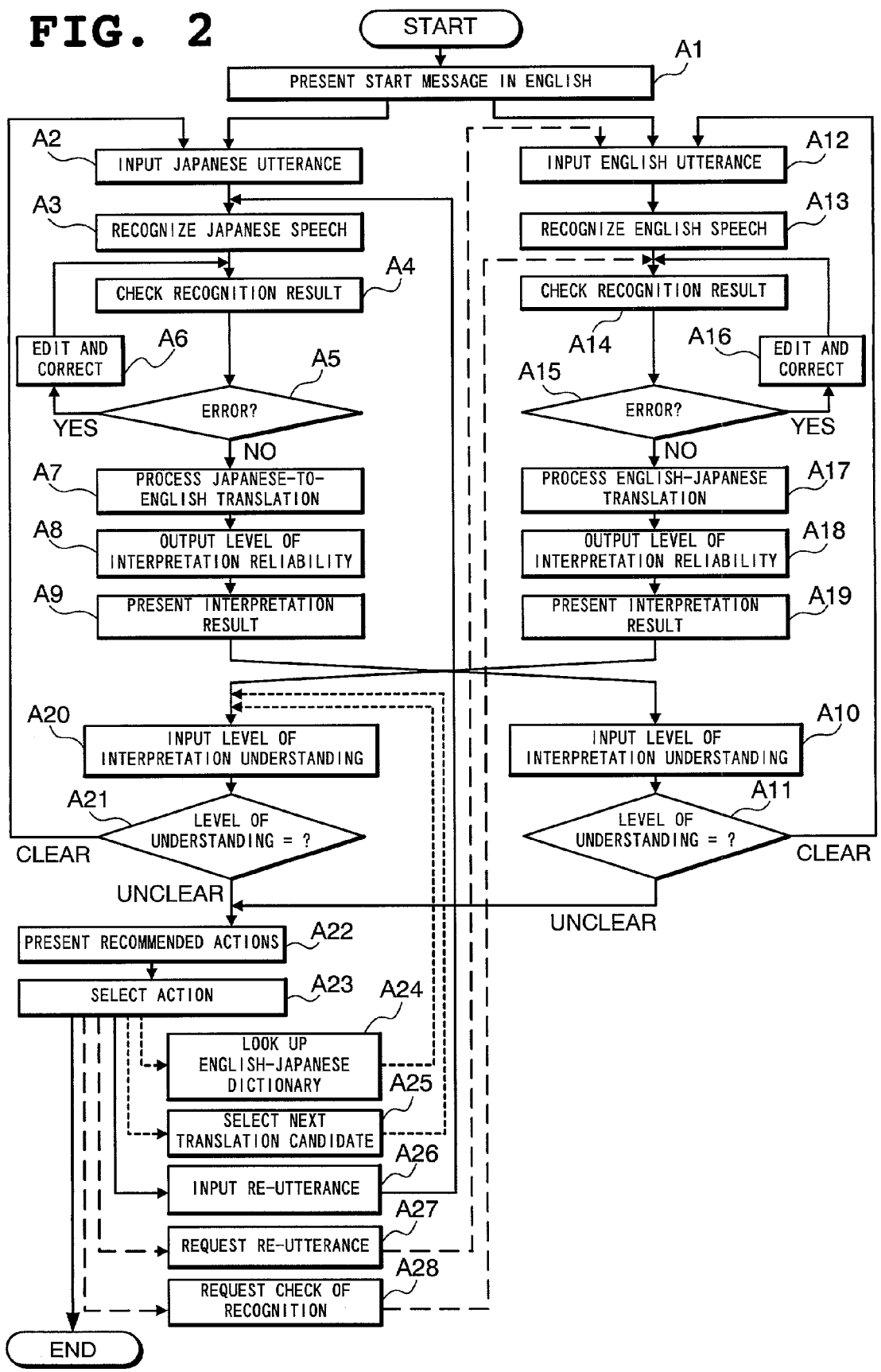
FIG. 2 is a flow chart diagram showing the flow of operation of an automatic interpreting system according to one aspect of the present invention.

One aspect of the present invention will now be described in detail with reference to FIGS. 1 and 2. FIG. 1 is a block diagram showing the configuration of an automatic interpreting system according to one aspect of the present invention. FIG. 2 is a flow chart diagram showing the flow of interpretation performed by this automatic interpreting system.

As shown in FIG. 1, an automatic interpreting system according to one aspect of the present invention comprises an input device 100, an output device 200, an interpretation integration device 300, a speech recognition device 400, a speech synthesis device 500, and a machine translation device 600.

The input device 100 includes a voice input unit 101, a pen input unit 102, and a key input unit 103. The voice input unit 101 inputs an utterance of the user in the form of voice data. The pen input unit 102 inputs an utterance in the form of position information, representing the position of a touch of a pen point or the like made by the user on a panel (touch panel) or the like that is incorporated in a pressure-sensitive sensor of a display unit. The key input unit 103 enables input or other actions by typing of a text, which is primarily achieved by typing operation on a keyboard by the user.

The output device 200 includes a voice output unit 201 and a display unit 202. The voice output unit 201 outputs voice data through a speaker or the like. The display unit 202 outputs on the display the results of the automatic interpreting process, in addition to display information that is input through the operating panel using a pen or other means.

The interpretation integration device 300 includes a control unit 301, a conversation history managing unit 302, and a conversation navigation processing unit 303. The control unit 301 mediates input/output data between devices and between processing units, in addition to controlling procedures. These input/output data include inputs of speech information, operation information, and position information from the input device 100; outputs of voice data and display information to the output device 200; outputs of conversation history information to the conversation history managing unit 302; inputs of conversation navigation information from the conversation navigation processing unit 303; outputs of speech information to and inputs of speech recognition results from the speech recognition device 400; outputs of speech information to the speech synthesis device 500; and inputs of translation input sentences to and outputs of translation sentences and interpretation reliability from the machine translation device 600.

The speech recognition device 400, speech synthesis device 500, machine translation device 600 operate individually as outlined below. The speech recognition device 400 uses voice data as input to recognize and output the content of an utterance of the speaker in the form of text data. The speech synthesis device 500 uses a translation sentence and other text data to synthesize and output voice data. The machine translation device 600 uses the text data of an utterance of the speaker and the like as input to perform the translation process for the designated language pair and outputs the interpretation result and interpretation reliability generated by this process.

The overall operation of an automatic interpreting system in the above-described configuration will now be described in detail with reference to the flow chart of FIG. 2. This description will be given for cases in which the Japanese speaker receives conversation navigation.

Upon the start of utilization of the interpreting system, the English speaker receives an English message, informing the start of conversation with the aid of an automatic interpreting system (Step A1 in FIG. 2). If an utterance is first made by the Japanese speaker, the Japanese utterance is input (Step A2), and Japanese speech recognition of the input voice data is conducted (Step A3). Speech recognition results are presented to the user (Japanese speaker), who checks them for errors (Step A4). If determined to contain any error in Step A5, the recognition results are edited and corrected (Step A6). The recognition results after edition and correction are checked again (Step A4), and thus the recognition results free from error are obtained.

The Japanese-to-English translation process is performed using as input the correct recognition results obtained in this manner (Step A7), and the level of interpretation reliability that is calculated during the translation process is output (Step A8), along with translation results. The translation results are synthesized into speech for audio output and also presented to the English speaker by showing the interpretation result on the display (Step A9). From the interpretation result presented, the English speaker determines whether or not he or she can grasp the meaning of the utterance, and selects and inputs either "clear" or "unclear" to indicate the level of interpretation understanding (Step A10).

According to the present aspect, if the level of interpretation understanding is determined to be "unclear" in Step A11, the current status of the conversation is determined by way of finding an applicable category among the pre-determined categories based on the data of interpretation understanding and interpretation reliability obtained from the previous utterance, and recommended actions are presented as the most appropriate actions for the user to take to deal with the current status thus determined (Step A22). If, on the other hand, the level of interpretation understanding is "clear" in Step A11, the English speaker inputs an English utterance in response to the utterance made by the Japanese speaker (Step A12). Following this, as with the case of Japanese-to-English translation (Steps A2 through A9), the English-Japanese translation process is performed, and the interpretation results from the English speaker's utterance are presented to the Japanese speaker (Steps A12 through A19).

From the interpretation result presented, the Japanese speaker determines whether or not he or she can grasp the meaning of the utterance, and selects and inputs either "clear" or "unclear" to indicate the level of interpretation understanding (Step A20). If the level of interpretation understanding is "clear" in Step A21, the Japanese speaker inputs a Japanese utterance in response to the utterance made by the English speaker (Step A2), and repeats the same steps until "terminate" is selected in the step of selecting the next action. If, on the other hand, the level of interpretation understanding is determined to be "unclear" in Step A21, the current status of the conversation is determined by way of finding an applicable category among the pre-determined categories based on the data of interpretation understanding and interpretation reliability obtained from the previous utterance, and recommended actions are presented as the most appropriate actions for the user to take to deal with the current status thus determined (Step A22).

The actions to deal with situations in which the interpretation understanding is "unclear" will now be described in detail. In presenting recommended actions (Step A22), the conversation status is determined based on the data of interpretation understanding and interpretation reliability for the current utterance and the previous utterance, by way of finding an applicable category from the following four categories: (1) "Japanese speaker misunderstands English-Japanese interpretation result," (2) "English-Japanese interpretation result is non-understandable," (3) "English speaker misunderstands Japanese-to-English interpretation result," or (4) "Japanese-to-English interpretation result is non-understandable." In addition, actions that are the most appropriate for the conversation status is selected and presented as recommended actions to the Japanese speaker from the following five actions: (1) "look up English-Japanese dictionary," (2) "select next translation candidate," (3) "input re-utterance," (4) "request re-utterance," or (5) "request check of recognition."

In selecting an action, the Japanese speaker selects an action that he or she will actually take from one or more recommended actions that are presented (Step A23). If the Japanese speaker selects (1) "look up English-Japanese dictionary," he or she looks up the English-Japanese dictionary to find an equivalent to an English word appearing in the Japanese-to-English interpretation result (Step A24), and inputs the level of interpretation understanding for the Japanese-to-English interpretation result after looking up the English-Japanese dictionary (Step A20). If the Japanese speaker selects (2) "select next translation candidate," the next candidates for the translation results obtained from the English-Japanese translation process (Step A17) are presented; from these candidates, the Japanese speaker selects the most understandable one (Step A25), and inputs the level of interpretation understanding for the Japanese-to-English interpretation result after selecting the next translation candidate (Step A20). If the Japanese speaker selects (3) "input re-utterance," the Japanese speaker inputs a Japanese utterance, which is the re-utterance of his or her previous utterance (Step A26), and speech recognition is performed on the new Japanese utterance (Step A3). If the Japanese speaker selects (4) "request re-utterance," a message is presented to the English speaker, requesting the English speaker to re-utter his or her previous utterance (Step A27), in response to which the English speaker inputs an English utterance (Step A12). If the Japanese speaker selects (5) "request check of recognition," a message is presented to the English speaker, requesting the English speaker to re-check the recognition result of the previous utterance for any error (Step A28), in response to which the English speaker checks the speech recognition result (Step A14). Finally, in selecting an action in Step A23, selecting "terminate automatic interpreting" terminates the automatic interpreting process.

Thus, if during conversation the interpretation result of an utterance is determined to be non-understandable to the receiving party, an automatic interpreting system according to the present aspect can determine whether the inability to understand is due to an error in interpretation of the current utterance or a misunderstanding caused by interpretation of the previous utterance, by including a control unit 301 for ensuring efficient linkage of inputs/outputs and processes between different devices in an interpretation integration device 300 for connecting these devices, i.e., an input device 100, an output device 200, a speech recognition device 400, a speech synthesis device 500, and a machine translation device 600, with one another; a conversation history managing unit 302 for determining the level of interpretation reliability by calculating a value of validity based on the interpretation result, inputting the level of interpretation understanding as the receiving-side speaker's subjective evaluation of how well he or she can grasp the meaning of the interpretation result, and recording and holding, as interpretation history information, the values of interpretation reliability and interpretation understanding for each utterance subject to interpretation; and a conversation status determination processing unit 303 for determining the conversation status based on the interpretation history information and outputting the conversation status thus determined.

Furthermore, by incorporating a recommended action determination processing unit, the present aspect can output as recommended actions the most appropriate actions for the conversation status among options, including requesting re-utterance, re-uttering, requesting check of recognition, looking up dictionary, and selecting next translation candidate, if the interpretation result of an utterance in a conversation is non-understandable to the other party.

Furthermore, if the interpretation result of an utterance in a conversation is non-understandable to the other party, the present aspect can also determine whether the inability to understand is due to an error in interpretation of the current utterance or a misunderstanding caused by interpretation of the previous utterance, by presenting to the speaker directly the conversation status determined based on interpretation history information.

(Embodiment)

Figure 6:
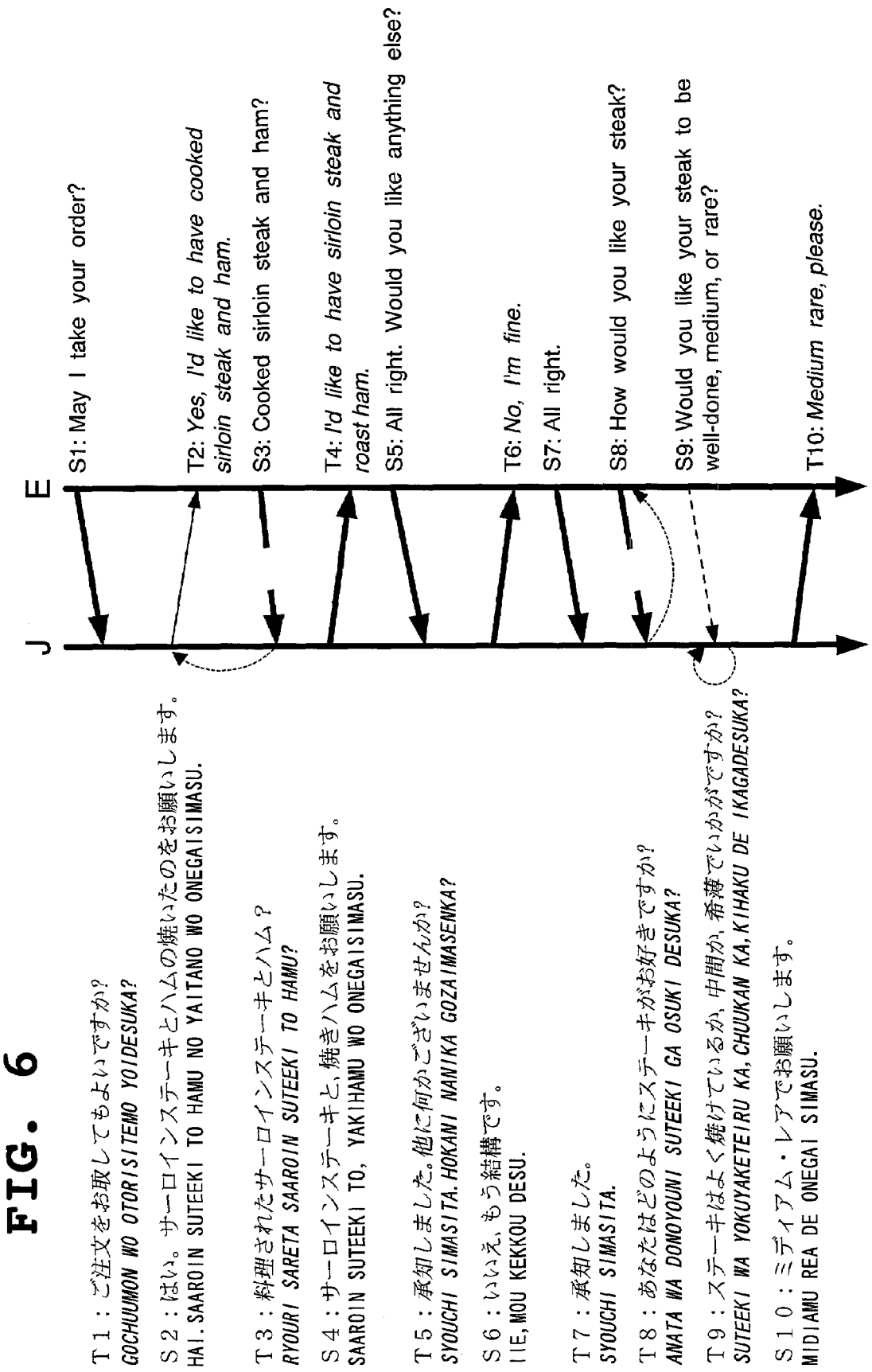
FIG. 6 is a diagram for a sample case according to one embodiment of the present invention, showing conversation statuses and recommended actions presented for respective statuses that are involved in a scene at a restaurant, in which a customer (Japanese speaker J) orders dishes from a waiter (English Speaker E)
Figure 7:
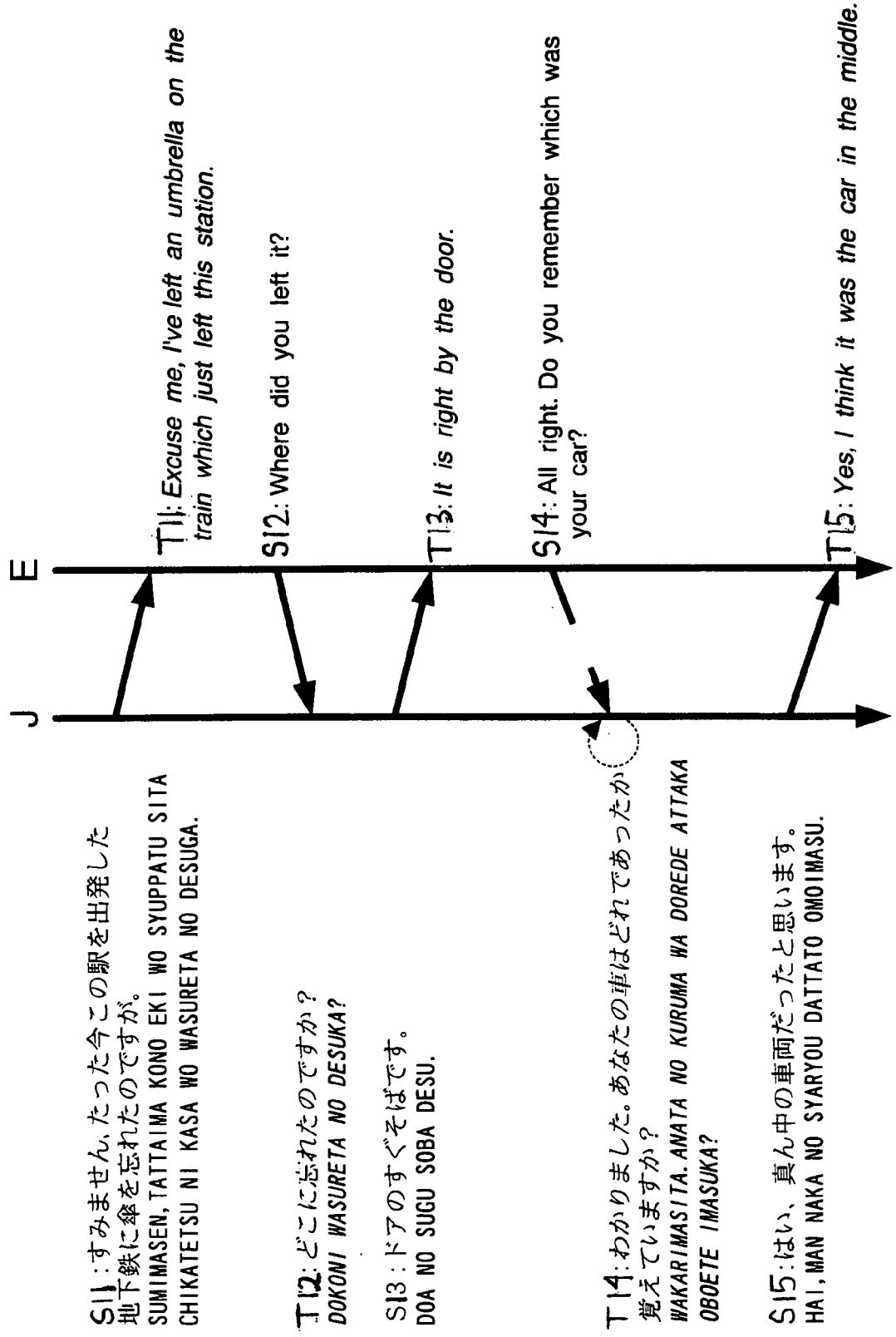
FIG. 7 is a diagram for a sample case according to one embodiment of the present invention, showing conversation statuses and recommended actions presented for respective statuses that are involved in a scene at a railway station, in which a passenger (Japanese speaker J) tells a station employee (English Speaker E) that he or she has left something in the train.

In order to provide more detailed descriptions of the above-mentioned aspect of the present invention, a specific embodiment of the present invention will be described in detail with reference to FIGS. 3 through 7. FIG. 3 is a diagram showing combinations of interpretation reliability and interpretation understanding and the method for displaying a diagram of such combinations. FIG. 4 is a diagram showing different conversation statuses and corresponding utterance cases according to one embodiment of the present invention. FIG. 5 is a diagram showing different conversation statuses and recommended actions presented for each status according to one embodiment of the present invention. FIGS. 6 and 7 are diagrams showing sample cases.

First, the step of presenting recommended actions (Step A22) in FIG. 2 will be described. As mentioned in the description of the aspect above, the presentation of recommended actions (Step A22) is made according to the conversation status that has been determined based on the interpretation understanding and interpretation reliability determined for the current utterance and the previous utterance.

More specifically, if each utterance in a conversation is categorized, for example, into two values for interpretation understanding, "clear" and "unclear," and also into two values for interpretation reliability, "high" and "low," based on a given threshold, each utterance can be represented as a combination of two values (understanding) and two values (reliability) as shown in FIG. 3. Where, J and E represent Japanese and English, respectively; an arrow from J to E represents an utterance from the Japanese speaker to the English speaker; different arrow thickness represents different levels of interpretation reliability (i.e., a thick arrow indicates that reliability is high) and solid and dashed lines represent different levels of interpretation understanding (i.e., a solid line indicates that understanding is clear).

FIG. 4 uses such a diagram form to show utterance cases that are applicable to four different conversation statuses: "English-Japanese—misunderstood," "Japanese-to-English—non-understandable," "Japanese-to-English—misunderstood," "English-Japanese—non-understandable." This diagram for different utterance cases takes into account not only the current utterance but also the previous utterance; the conversation status is determined based on these utterance cases.

For example, suppose that the level of interpretation understanding for the current utterance is "unclear." If the value of interpretation reliability is "low" (indicated by a thin dashed line in the diagram), the conversation status is determined to be "non-understandable" (with regard to the current utterance). If the value of interpretation reliability is "high," then the conversation status is determined by taking into account the value of interpretation reliability for the previous utterance. For example, if the levels of interpretation understanding and interpretation reliability for the current utterance are "unclear" and "high," respectively (indicated by a thick dashed line in the diagram), and if the levels of interpretation understanding and interpretation reliability for the previous utterance are "clear" and "low," respectively (indicated by a thin dashed line in the diagram), then the conversation status is determined to be "misunderstood" (with regard to the previous utterance).

FIG. 5 shows recommended actions that are presented to the Japanese speaker for different conversation statuses: "English-Japanese—misunderstood," "Japanese-to-English—non-understandable," "Japanese-to-English—misunderstood," "English-Japanese—non-understandable," respectively. In the case of "English-Japanese—misunderstood," "request re-utterance" (from the English speaker) will be presented. In the case of "Japanese-to-English—non-understandable" and Japanese-to-English—misunderstood," "re-utterance" to the Japanese speaker will be presented. In the case of "English-Japanese—non-understandable," "request re-utterance" and "request check of recognition" (from the English speaker), and "look up English-Japanese dictionary" and "select next translation candidate" (by the Japanese speaker) will be presented.

The operation of an automatic interpreting system according to the present embodiment in a specific case will now be described with reference to FIGS. 6 and 7. In these diagrams, utterances of the English speaker are indicated on Side E, and utterances of the Japanese speaker on Side J. Each utterance is assigned Utterance No. n (=1, 2, 3, . . . ) in the order of appearance. An utterance in the original language (source language) is represented as Sn, and the interpretation result of that utterance as Tn. The conversation status (the levels of interpretation reliability and interpretation understanding) for an utterance and recommended actions therefore are expressed in the form of diagram as shown in FIG. 5. Descriptions below will be made on the assumption that any error in speech recognition will always be corrected appropriately during a check of recognition results.

First, the first case will be described with reference to FIG. 6. FIG. 6 is a diagram showing conversation statuses and recommended actions presented for respective statuses that are involved in a conversation at a restaurant, in which a customer (Japanese speaker J) orders dishes from a waiter (English Speaker E).

As shown in FIG. 6, for T1, which is the interpretation result of Utterance S1 of the English speaker, the levels of interpretation reliability and interpretation understanding are determined to be "high" and "clear," respectively. In response to T1, the Japanese speaker makes Utterance S2; " (YAITANO)" in the "サーロインステーキとハムの焼いたの (SAAROIN SUTEEKI TO HAMU NO YAITANO)" portion of S2 is considered to modify "ハム (HAMU)"

Looking at T2, which is the interpretation result of S2, however, the portion corresponding to "サーロインス テーキとハムの焼いたの (SAAROIN SUTEEKI TO HAMU NO YAITANO)" has been translated as "cooked sirloin steak and ham." "Cooked," which is an equivalent to ", (YAITANO)" modifies the entire part of the parallel structure "sirloin steak and ham," which is not a correct interpretation of the original utterance.

By employing an approach for structural analysis that considers the ambiguity of a structure as the method of calculating the value of interpretation reliability, it becomes possible to estimate the interpretation reliability for S2 at a low value if an ambiguity occurs in an utterance containing such a parallel structure, and consequently the level of interpretation reliability for T2 is also determined to be low. The value of interpretation understanding is "clear" (indicated by a thin solid line in the diagram), because Speaker E, who is the listener to the interpretation result, determines that the intention of the order can roughly be understood, although he or she cannot make out exactly what "cooked sirloin steak and ham" is like.

Next, in Utterance S3 in response to T2, Speaker E asks the specific meaning of the utterance. Although the value of interpretation reliability for Interpretation Result T3 is "high," Speaker J determines that the level of interpretation understanding is "unclear," because there is a discrepancy between "サーロ インステーキとハムの焼いたの (SAAROIN SUTEEKI TO HAMU NO YAITANO)" in S2 and his or her true intention (indicated by a thick dashed line in the diagram).

Putting these results in contrast with the utterance cases shown in FIG. 4, it is determined that the conversation status is "Japanese-to-English—misunderstood." Furthermore, as a recommended action for this status, "re-utterance by Japanese speaker" is presented, as shown in FIG. 5. Speaker J then selects the recommended action "re-utterance by Japanese speaker" (indicated by a dotted arc T3-S2), and in S4 makes a re-utterance of S2. The level of interpretation understanding for Interpretation Result T4 is now "clear," which means that the re-utterance has recovered the communication between the two speakers.

The conversation thereafter runs smoothly, as is demonstrated by the "high" interpretation reliability and the "clear" interpretation understanding for Utterances S5 through S7.

Interpretation Result T8, "あなたはどのようにステーキ がお好きですか？ (ANATA WA DONOYOUNI SUTEEKI GA OSUKI DESUKA?)" for Utterance S8 is a literal translation, not a natural Japanese expression, but the value of interpretation reliability is "high." Speaker J determines that the interpretation understanding for T8 is "unclear" (indicated by a thick dashed line in the diagram). This is because, while S8 is a fixed expression that is usually used for asking how meat should be done, Interpretation Result T8 fails to convey the nuance correctly. With reference to FIG. 4, the conversation status is determined to be "English-Japanese—non-understandable" from the results described above.

In response to Interpretation Result T8, "request re-utterance from English speaker," "request check of recognition from English speaker," "look up English-Japanese dictionary by Japanese speaker," and "select next translation candidate by Japanese speaker" are presented as recommended actions, as shown in FIG. 5. Speaker J selects "request re-utterance from English speaker" as the action to take (indicated by a dotted arc T8-S8). Receiving this request for re-utterance, Speaker E makes Re-utterance S9 of S8, asking how the Japanese speaker likes his or her steak done.

In the translation of S9, it is desirable that "ウェルダン,(WERUDAN)" "ミディアム,(MIDIAMU)" and "レア(REA)" are used as equivalents to "well-done," "medium," and "rare" in S9, respectively. Because the translation dictionary for English-Japanese machine translation does not contain appropriate terms, however, the corresponding portion of Interpretation Result T9 is "よく焼けているか、中間か、希薄で、(YOKU YAKETEIRU KA, CHUUKAN KA, KIHAKU DE)" which is an inappropriate interpretation result.

By utilizing, in addition to structural ambiguity that is considered in structural analysis, the method of calculating interpretation reliability, in which semantic consistency is considered, it becomes possible to determined that, for example, the reliability of an interpretation result is low if the meanings of different elements within a parallel structure are irrelevant and inconsistent. Using this method, the low consistency among the equivalents of the elements in the parallel structure in T9, i.e., "よく焼けている、(YOKU YAKETEIRU)" "中間, (CHUUKAN)" and "希薄, (KIHAKU)" yields the determination that its interpretation reliability is low. Speaker J determines that the level of interpretation understanding for T9 is "unclear" (indicated by a thin dashed line in the diagram). With reference to FIG. 4, the conversation status is determined to be "English-Japanese—non-understandable" from the results described above.

As recommended actions for this conversation status, "request re-utterance from English speaker," "request check of recognition from English speaker," "look up English-Japanese dictionary by Japanese speaker," and "select next translation candidate by Japanese speaker" are presented. This time, Speaker J selects "look up English-Japanese dictionary by Japanese speaker" as the action to take (indicated by a dotted ring T9—T9), and looks up the English-Japanese dictionary to find an equivalent to the word "rare" that appears in S9. Speaker J then finds "(REA)" which means a way of baking meat, among the Japanese equivalents to "rare," and grasps the correct meaning of Utterance S9. In S10, Speaker J makes an utterance, "(MIDIAMU REA WO ONEGAI SIMASU)" in response to that question. The interpretation result T10, related to the utterance S10, determines that the interpretation reliability is "high" and the interpretation understanding is "clear" meaning that the conversation runs smoothly.

Next, the second case will be described with reference to FIG. 7. FIG. 7 is a diagram showing conversation statuses and recommended actions presented for respective statuses that are involved in a conversation at a railway station, in which a passenger (Japanese speaker J) tells a station employee (English Speaker E) that he or she has left something in the train.

For the interpretations from Utterances S11 through S13 in the diagram, the interpretation reliability is "high" and the interpretation understanding is "clear," demonstrating that the conversation has run smoothly.

For Interpretation Result T14 for S14, the values of interpretation reliability and interpretation understanding are "high" and "unclear," respectively (indicated by a thick dashed line in the diagram). With reference to FIG. 4, the conversation status is determined to be "English-Japanese—non-understandable" from the results described above. As recommended actions, "request re-utterance from English speaker," "request check of recognition from English speaker," "look up English-Japanese dictionary by Japanese speaker," and "select next translation candidate by Japanese speaker" are presented, as shown in FIG. 5.

This time, Speaker J selects "look up English-Japanese dictionary by Japanese speaker" as the action to take (indicated by a dotted ring T14—T14). Speaker J finds "(SYARYOU)" in addition to "(KURUMA)" among the equivalents to the word "car" in S14, and grasps the correct meaning of Utterance S14. In Utterance S15, Speaker J says "(HAI, MAN NAKA NO SYARYOU DATTATO OMOIMASU)" as an answer to that question. The interpretation result T15, related to the utterance S15, determines that the interpretation reliability is "high" and the interpretation understanding is "clear" meaning that the conversation runs smoothly.

Thus, it can be ensured that a conversation runs smoothly by obtaining the level of interpretation reliability for the interpretation of an utterance; allowing the speaker on the listening side to input the level of interpretation understanding for that interpretation; storing these data in the interpretation history managing part; if the level of interpretation understanding for the current utterance is "unclear," determining the conversation status by going back to the previous utterance and finding an applicable category among the pre-determined categories based on the data stored in the interpretation history managing part; and presenting recommended actions pre-determined for each conversation status.

While the present embodiment has been described by using sample conversations between a Japanese speaker and an English speaker, it should be readily appreciated that the present invention is not limited to the embodiment above but can be applied similarly to conversations between other language pairs.

It should also be readily appreciated that, in addition to being implemented as hardware, the functionality of an automatic interpreting system according to the present embodiment may be implemented by having an automatic translation program, which is a computer program having the functions, loaded in the memory of a computer processor. This automatic translation program is stored in a magnetic disc, semiconductor memory, or other storage medium (reference number). The automatic translation program can implement the aforementioned functions by being loaded from such storage medium to a computer processor and controlling the operation of the computer processor.

As described in the foregoing, an automatic interpreting system and automatic interpreting method according to the present invention can provide the following effects:

The first effect of the present invention is that, if the interpretation result of an utterance in a conversation under automatic interpretation is determined to be non-understandable by the other party, the conversation status, i.e., whether the inability of understanding is due to an error in the interpretation of the current utterance or a misunderstanding caused by the previous utterance, can be determined automatically.

This is because the present invention can obtain the level of interpretation reliability by calculating a value of validity based on the interpretation result of an utterance; obtain the level of interpretation understanding as the receiving-side speaker's subjective evaluation of how well he or she can grasp the meaning of the interpretation result; record and hold, as interpretation history information, the values of interpretation reliability and interpretation understanding for each utterance subject to interpretation; if the level of interpretation understanding for an utterance is "not understandable," determine whether the inability of understanding is due to an error in the interpretation of the current utterance or a misunderstanding caused by the previous utterance, based on the interpretation history information; and output the result as the conversation status.

The second effect of the present invention is that, if the level of interpretation understanding for an utterance is "not understandable," specific actions to take as appropriate can be presented on a case-by-case basis.

This is because the present invention can determine and output as recommended actions the most appropriate actions to take among several options, including requesting re-utterance, re-uttering, requesting check of recognition, looking up dictionary, and selecting next translation candidate, based on the conversation status determined using the interpretation history information.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An automatic interpreting system comprising:
   an inputting device that receives an input utterance;
   an interpreting device that recognizes the input utterance and interprets the input utterance into a specified language;
   an outputting device that outputs interpretation results;
   a conversation history managing unit that determines the validity of the interpretation result of the input utterance to obtain interpretation reliability,
   allows the receiving-side speaker to input as the level of interpretation understanding how well said receiving-speaker can grasp the meaning of the interpretation result, and
   records and stores, as interpretation history information, said level of interpretation reliability and said level of interpretation understanding for each said utterance; and
   a conversation status determination processing unit that, if the interpretation of an utterance is not understandable to the receiving party, determines the conversation status, based on said interpretation reliability and said interpretation understanding, for said utterance and a previous utterance, which are stored in said conversation history managing unit.

2. The automatic interpreting system as set forth in claim 1, comprising:
   recommended action determination processing unit that outputs to the speaker, as recommended actions, predetermined actions for the conversation status determined by said conversation status determination processing unit.

3. The automatic interpreting system as set forth in claim 1, wherein
   if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories.

4. The automatic interpreting system as set forth in claim 1, comprising
   recommended action determination processing unit that outputs to the speaker, as recommended actions, predetermined actions for the conversation status determined by said conversation status determination processing unit, wherein
   if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories.

5. The automatic interpreting system as set forth in claim 3, wherein
   if said interpretation reliability is categorized into two values, high and low, and said interpretation understanding is categorized into two values, clear and unclear, and if said interpretation understanding for an utterance is "unclear,"
   if the value of said interpretation reliability for said utterance is "high" and the values of said interpretation reliability and said interpretation understanding for the previous utterance are "low" and "clear," respectively, the conversation status determination processing unit determines that a misunderstanding has occurred in the interpretation result of the previous utterance and sets the conversation status, and
   if the value of said interpretation reliability for said utterance is "high" and the values of said interpretation reliability and said interpretation understanding for the previous utterance are "high" and "clear," respectively, or if the value of said interpretation reliability for said utterance is "low" and the value of said interpretation understanding for the previous utterance is "clear," the conversation status determination processing unit determines that an error has occurred in the interpretation result of said utterance and sets the conversation status.

6. The automatic interpreting system as set forth in claim 1, wherein
   actions to be presented by said recommended action determination processing unit are selected from options, including requesting re-utterance, re-uttering, requesting check of recognition, looking up dictionary, and selecting next translation candidate.

7. The automatic interpreting system as set forth in claim 6, wherein
   in conversation between a speaker using the first language and another speaker using the second language,
   if the values of said interpretation reliability and said interpretation understanding for the current utterance in the first language are "high" and "unclear," respectively, and the values of said interpretation reliability and said interpretation understanding for the previous utterance in the second language "low" and "clear," respectively, "request re-utterance from second speaker" is presented by said recommended action determination processing unit,
   if the values of said interpretation reliability and said interpretation understanding for the current utterance in the first language are "low" and "unclear," respectively, and the value of said interpretation reliability for the previous utterance in the second language is "high," or if the values of said interpretation reliability and said interpretation understanding for the current utterance in the first language are "low" and "unclear," respectively, and the values of said interpretation reliability and said interpretation understanding for the previous utterance in the second language are "high" and "clear," respectively, "first speaker re-utters" and "first speaker checks recognition" are presented by said recommended action determination processing unit, if the values of said interpretation reliability and said interpretation understanding for the current utterance in the second language are "high" and "unclear," respectively, and the values of said interpretation reliability and said interpretation understanding for the previous utterance in the first language "low" and "clear," respectively, "first speaker re-utters" is presented by said recommended action determination processing unit, and if the values of said interpretation reliability and said interpretation understanding for the current utterance in the second language are "low" and "unclear," respectively, and the value of said interpretation reliability for the previous utterance in the first language is "high," or if the values of said interpretation reliability and said interpretation understanding for the current utterance in the second language are "high" and "unclear," respectively, and the values of said interpretation reliability and said interpretation understanding for the previous utterance in the first language are "high" and "clear," respectively, "second speaker re-utters," "second speaker checks recognition," "first speaker looks up dictionary", and "first speaker selects next translation candidate" are presented by said recommended action determination processing unit.

8. The automatic interpreting system as set forth in claim 1, comprising:

recommended action determination processing unit that outputs to the speaker, as recommended actions, pre-determined actions for the conversation status determined by said conversation status determination processing unit, wherein actions to be presented by said recommended action determination processing unit are selected from options, including requesting re-utterance, re-uttering, requesting check of recognition, looking up dictionary, and selecting next translation candidate.

9. The automatic interpreting system as set forth in claim 1, wherein if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories, and actions to be presented by said recommended action determination processing unit are selected from options, including requesting re-utterance, re-uttering, requesting check of recognition, looking up dictionary, and selecting next translation candidate.

10. The automatic interpreting system as set forth in claim 1, wherein assuming that said interpretation reliability is categorized into two values, high and low, and said interpretation understanding is categorized into two values, clear and unclear, and if said interpretation understanding for an utterance is "unclear,"

if the value of said interpretation reliability for said utterance is "high" and said interpretation reliability and said interpretation understanding for the previous utterance are "low" and "clear," respectively, the conversation status determination processing unit determines that a misunderstanding has occurred in the interpretation result of the previous utterance and sets the conversation status, and if the value of said interpretation reliability for said utterance is "high" and the values of said interpretation reliability and said interpretation understanding for the previous utterance are "high" and "clear," respectively, or if the value of said interpretation reliability for said utterance is "low" and the value of said interpretation understanding for the previous utterance is "clear," the conversation status determination processing unit determines that an error has occurred in the interpretation result of said utterance and sets the conversation status, and actions to be presented by said recommended action determination processing unit are selected from options, including requesting re-utterance, re-uttering, requesting check of recognition, looking up dictionary, and selecting next translation candidate.

11. An automatic interpreting method for recognizing an input utterance, interpreting the input utterance into a specified language, and outputting an interpretation result, comprising the steps of:

determining the validity of the interpretation result of said input utterance to obtain the level of interpretation reliability, and allowing the receiving-side speaker to input as the level of interpretation understanding how well she said receiving-side speaker can grasp the meaning of the interpretation result, recording and storing, as interpretation history information, said level of interpretation reliability and said level of interpretation understanding for each said utterance, and if the interpretation of an utterance is not understandable to the receiving party, determining the conversation status: based on said interpretation reliability and said interpretation understandings for said utterance and a previous utterance, which are stored as the interpretation history information.

12. The automatic interpreting method as set forth in claim 11, wherein pre-determined actions according to said conversation status are presented to the speaker as recommended actions.

13. The automatic interpreting method as set forth in claim 11, wherein if the level of interpretation understanding for said utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories.

14. The automatic interpreting method as set forth in claim 11, wherein pre-determined actions for said conversation status are presented to the speaker as recommended actions, and if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories.

15. The automatic interpreting method as set forth in claim 11, wherein if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories, assuming that said interpretation reliability is categorized into two values, high and low, and said interpretation understanding is categorized into two values, clear and unclear, and if said interpretation understanding for an utterance is "unclear,"

if the value of said interpretation reliability for said utterance is "high" and said interpretation reliability and said interpretation understanding for the previous utterance are "low" and "clear," respectively, the conversation status is determined to be a misunderstanding that has occurred in the interpretation result of the previous utterance and the conversation status is then set, and if the value of said interpretation reliability for said utterance is "high" and the values of said interpretation reliability and said interpretation understanding for the previous utterance are "high" and "clear," respectively, or if the value of said interpretation reliability for said utterance is "low" and the value of said interpretation understanding for the previous utterance is "clear," the conversation status is determined to be an error that has occurred in the interpretation result of said utterance and the conversation status is then set.

16. The automatic interpreting method as set forth in claim 11, wherein pre-determined actions for said conversation status are presented to the speaker as recommended actions, and actions to be presented as recommended actions are selected from options, including requesting re-utterance, re-uttering, requesting check of recognition, looking up dictionary, and selecting next translation candidate.

17. The automatic interpreting method as set forth in claim 16, wherein in conversation between a speaker using the first language and another speaker using the second language, if the values of said interpretation reliability and said interpretation understanding for the current utterance in the first language are "high" and "unclear," respectively, and the values of said interpretation reliability and said interpretation understanding for the previous utterance in the second language "low" and "clear," respectively, "request re-utterance from second speaker" is presented as the recommended action, if the values of said interpretation reliability and said interpretation understanding for the current utterance in the first language are "low" and "unclear," respectively, and the value of said interpretation reliability for the previous utterance in the second language is "high," or if the values of said interpretation reliability and said interpretation understanding for the current utterance in the first language are "low" and "unclear," respectively, and the values of said interpretation reliability and said interpretation understanding for the previous utterance in the second language are "high" and "clear," respectively, "first speaker re-utters" and "first speaker checks recognition" are presented as the recommended actions, if the values of said interpretation reliability and said interpretation understanding for the current utterance in the second language are "high" and "unclear," respectively, and the values of said interpretation reliability and said interpretation understanding for the previous utterance in the first language "low" and "clear," respectively, "first speaker re-utters" is presented as the recommended action, and if the values of said interpretation reliability and said interpretation understanding for the current utterance in the second language are "low" and "unclear," respectively, and the value of said interpretation reliability for the previous utterance in the first language is "high," or if the values of said interpretation reliability and said interpretation understanding for the current utterance in the second language are "high" and "unclear," respectively, and the values of said interpretation reliability and said interpretation understanding for the previous utterance in the first language are "high" and "clear," respectively, "second speaker re-utters," "second speaker checks recognition," "first speaker looks up dictionary", and "first speaker selects next translation candidate" are presented as the recommended actions.

18. The automatic interpreting method as set forth in claim 11, wherein if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories, and actions to be presented as recommended actions are selected from options, including requesting re-utterance, re-uttering, requesting check of recognition, looking up dictionary, and selecting next translation candidate.

19. The automatic interpreting method as set forth in claim 11, wherein if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories, assuming that said interpretation reliability is categorized into two values, high and low, and said interpretation understanding is categorized into two values, clear and unclear, and if said interpretation understanding for an utterance is "unclear,"

if the value of said interpretation reliability for said utterance is "high" and said interpretation reliability and said interpretation understanding for the previous utterance are "low" and "clear," respectively, the conversation status is determined to be a misunderstanding that has occurred in the interpretation result of the previous utterance and the conversation status is then set, if the value of said interpretation reliability for said utterance is "high" and the values of said interpretation reliability and said interpretation understanding for the previous utterance are "high" and "clear," respectively, or if the value of said interpretation reliability for said utterance is "low" and the value of said interpretation understanding for the previous utterance is "clear," the conversation status is determined to be an error that has occurred in the interpretation result of said utterance and the conversation status is then set, and actions to be presented as the recommended actions are selected from options, including requesting re-utterance, re-uttering, requesting check of recognition, looking up dictionary, and selecting next translation candidate.

20. An automatic interpreting program for recognizing an input utterance, interpreting the input utterance into a specified language, and outputting an interpretation result, comprising the functions of:

determining the validity of the interpretation result of said input utterance to obtain the level of interpretation reliability, and allowing the receiving-side speaker to input as the level of interpretation understanding how well she said receiving-side speaker can grasp the meaning of the interpretation result, recording and storing, as interpretation history information, said level of interpretation reliability and said level of interpretation understanding for each said utterance, and if the interpretation of an utterance is not understandable to the receiving party, determining the conversation status, based on said interpretation reliability and said interpretation understanding, for said utterance and a previous utterance, which are stored as said interpretation history information.

21. The automatic interpreting program as set forth in claim 20, wherein pre-determined actions according to said conversation status are presented to the speaker as recommended actions.

22. The automatic interpreting program as set forth in claim 20, wherein if the level of interpretation understanding for said utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories.

23. The automatic interpreting program as set forth in claim 20, wherein pre-determined actions for said conversation status are presented to the speaker as recommended actions, and if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories.

24. The automatic interpreting program as set forth in claim 20, wherein if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories, assuming that said interpretation reliability is categorized into two values, high and low, and said interpretation understanding is categorized into two values, clear and unclear, and if said interpretation understanding for an utterance is "unclear,"

if the value of said interpretation reliability for said utterance is "high" and said interpretation reliability and said interpretation understanding for the previous utterance are "low" and "clear," respectively, determining the conversation status to be a misunderstanding that has occurred in the interpretation result of the previous utterance and setting the conversation status, and if the value of said interpretation reliability for said utterance is "high" and the values of said interpretation reliability and said interpretation understanding for the previous utterance are "high" and "clear," respectively, or if the value of said interpretation reliability for said utterance is "low" and the value of said interpretation understanding for the previous utterance is "clear," determining the conversation status to be an error that has occurred in the interpretation result of said utterance and setting the conversation status.

25. The automatic interpreting program as set forth in claim 20, wherein pre-determined actions for said conversation status are presented to the speaker as recommended actions, and actions to be presented as recommended actions are selected from options, including requesting re-utterance, re-uttering, requesting check of recognition, looking up dictionary, and selecting next translation candidate.

26. The automatic interpreting program as set forth in claim 25, wherein in conversation between a speaker using the first language and another speaker using the second language, if the values of said interpretation reliability and said interpretation understanding for the current utterance in the first language are "high" and "unclear," respectively, and the values of said interpretation reliability and said interpretation understanding for the previous utterance in the second language "low" and "clear," respectively, presenting "request re-utterance from second speaker" as the recommended action, if the values of said interpretation reliability and said interpretation understanding for the current utterance in the first language are "low" and "unclear," respectively, and the value of said interpretation reliability for the previous utterance in the second language is "high," or if the values of said interpretation reliability and said interpretation understanding for the current utterance in the first language are "low" and "unclear," respectively, and the values of said interpretation reliability and said interpretation understanding for the previous utterance in the second language are "high" and "clear," respectively, presenting "first speaker re-utters" and "first speaker checks recognition" as the recommended actions, if the values of said interpretation reliability and said interpretation understanding for the current utterance in the second language are "high" and "unclear," respectively, and the values of said interpretation reliability and said interpretation understanding for the previous utterance in the first language "low" and "clear," respectively, presenting "first speaker re-utters" as the recommended action, and if the values of said interpretation reliability and said interpretation understanding for the current utterance in the second language are "low" and "unclear," respectively, and the value of said interpretation reliability for the previous utterance in the first language is "high," or if the values of said interpretation reliability and said interpretation understanding for the current utterance in the second language are "high" and "unclear," respectively, and the values of said interpretation reliability and said interpretation understanding for the previous utterance in the first language are "high" and "clear," respectively, presenting "second speaker re-utters," "second speaker checks recognition," "first speaker looks up dictionary", and "first speaker selects next translation candidate" as the recommended actions.

27. The automatic interpreting program as set forth in claim 20, wherein if the level of interpretation understanding for an utterance is "unclear," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories, and actions to be presented as recommended actions are selected from options, including requesting re-utterance, re-uttering, requesting check of recognition, looking up dictionary, and selecting next translation candidate.

28. The automatic interpreting program as set forth in claim 20, wherein if the level of interpretation understanding for an utterance is "not understandable," then the current conversation status is determined, i.e., whether an error has occurred in the interpretation result of said utterance or a misunderstanding has occurred in the interpretation result of the previous utterance, by putting the combinations of said interpretation reliability and said interpretation understanding for said utterance and for the previous utterance in contrast with the pre-determined categories, assuming that said interpretation reliability is categorized into two values, high and low, and said interpretation understanding is categorized into two values, clear and unclear, and if said interpretation understanding for an utterance is "unclear,"

if the value of said interpretation reliability for said utterance is "high" and said interpretation reliability and said interpretation understanding for the previous utterance are "low" and "clear," respectively, determining the conversation status to be a misunderstanding that has occurred in the interpretation result of the previous utterance and setting the conversation status, if the value of said interpretation reliability for said utterance is "high" and the values of said interpretation reliability and said interpretation understanding for the previous utterance are "high" and "clear," respectively, or if the value of said interpretation reliability for said utterance is "low" and the value of said interpretation understanding for the previous utterance is "clear," determining the conversation status to be an error that has occurred in the interpretation result of said utterance and setting the conversation status, and actions to be presented as recommended actions are selected from options, including requesting re-utterance, re-uttering, requesting check of recognition, looking up dictionary, and selecting next translation candidate.

* * * * *